No. 620,820.  
C. ZIES.  
AUTOMATIC KEG SOAKING APPARATUS.  
(Application filed Oct. 10, 1898.)  
(No Model.)  
Patented Mar. 7, 1899.  
2 Sheets—Sheet 1.
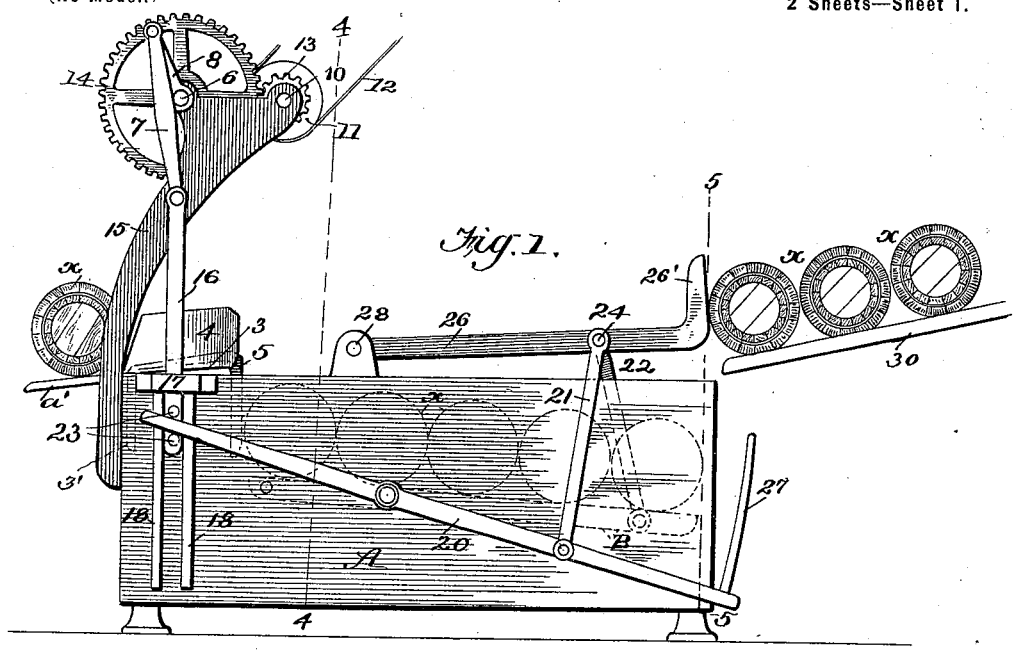
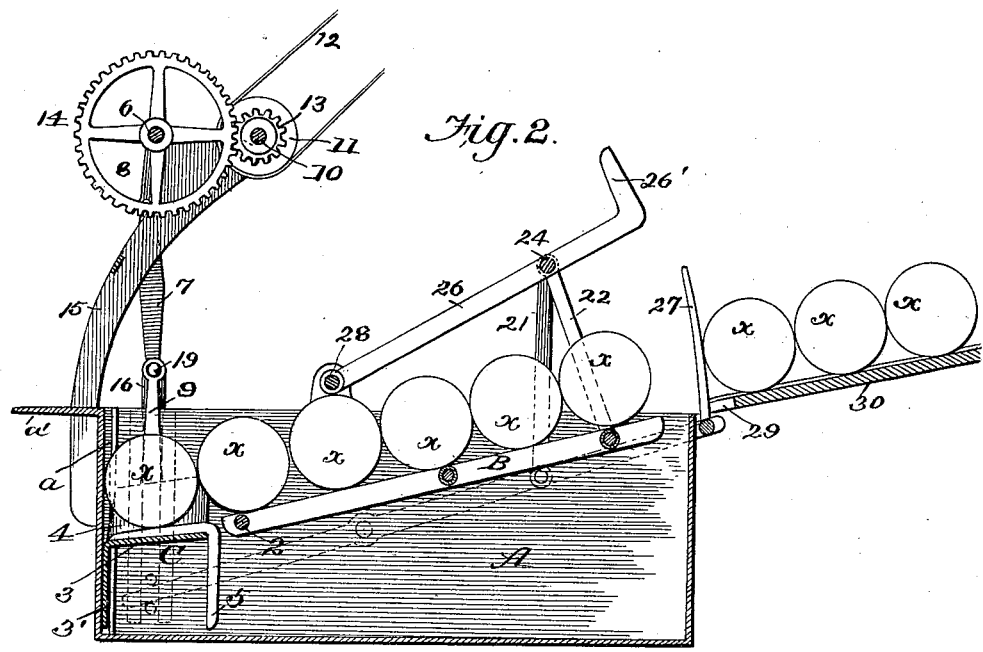
WITNESSES:  
Jos. A. Ryan  
Amos W Hart
INVENTOR  
Charles Zies.  
BY Munn & Co.  
ATTORNEYS.

No. 620,820. Patented Mar. 7, 1899.
C. ZIES.
AUTOMATIC KEG SOAKING APPARATUS.
(Application filed Oct. 10, 1898.)
(No Model.) 2 Sheets—Sheet 2.
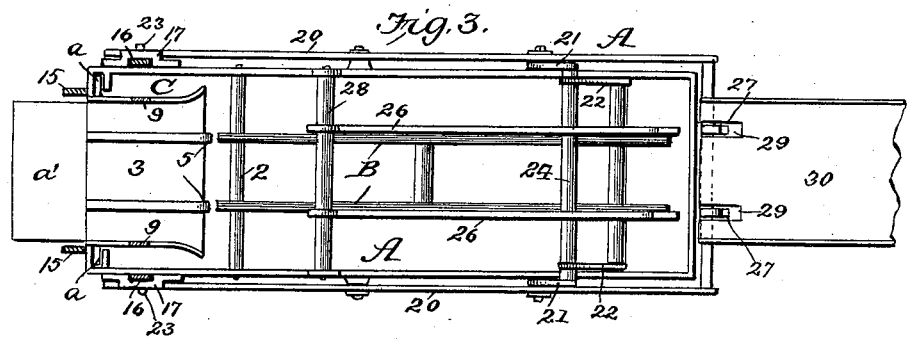
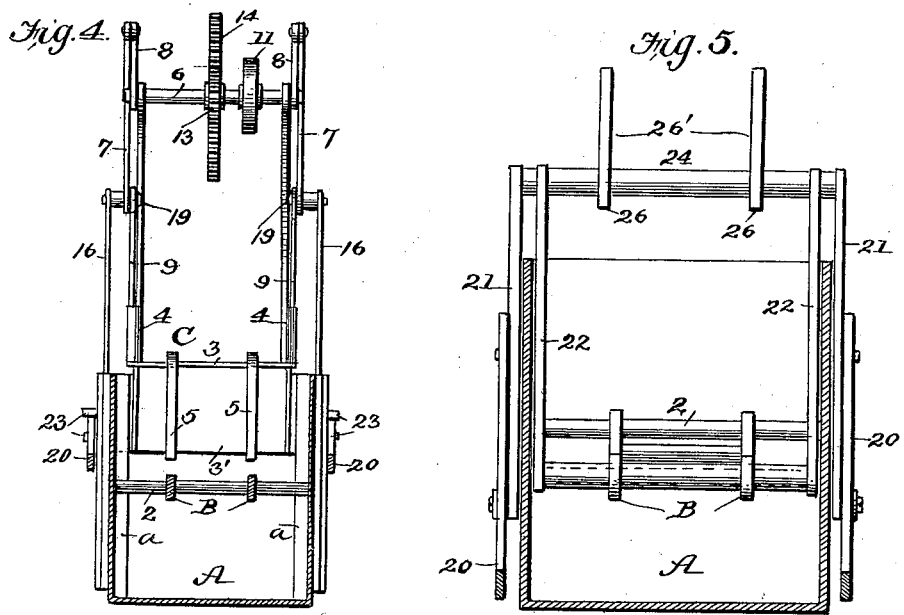
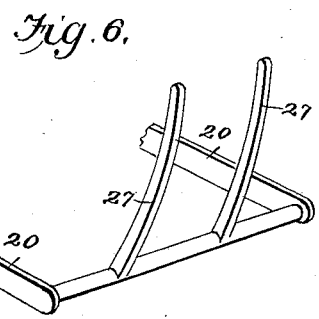
WITNESSES:
Jos. A. Ryan
Amos W. Hart
INVENTOR
Charles Zies.
BY Munn & Co.
ATTORNEYS.

UNITED STATES PATENT OFFICE.

CHARLES ZIES, OF BALTIMORE, MARYLAND.

AUTOMATIC KEG-SOAKING APPARATUS.

SPECIFICATION forming part of Letters Patent No. 620,820, dated March 7, 1899.

Application filed October 10, 1898. Serial No. 693,156. (No model.)

*To all whom it may concern:*

Be it known that I, CHARLES ZIES, a citizen of the United States, and a resident of Baltimore, in the State of Maryland, have made certain new and useful Improvements in Automatic Keg-Soaking Apparatus, of which the following is a specification.

It is the object of my invention to provide an improvement in that class of troughs or tanks for soaking and rinsing beer-kegs and other casks which are provided with automatic apparatus for causing such kegs or casks to roll and travel through the tank and to deliver them therefrom, say, to a scrubbing-machine. I have devised improved means or mechanism for submerging the kegs or casks in the body of water contained in the tank and also for causing the same to roll and travel from one end of the tank to the other, where an improved elevating and delivery mechanism is arranged for automatic coöperation with the means for submerging as aforesaid. I further provide an improved guard for regulating the admission of kegs or casks to the tank, the same being automatically operated in connection with the other mechanism above referred to.

The construction and arrangement and coaction of parts embodying my invention are hereinafter described with reference to accompanying drawings, (two sheets,) in which—

Figure 1 is a side view of my improved tank. Fig. 2 is a central longitudinal vertical section of the same. Fig. 3, Sheet 2, is a plan view, a portion being in section. Fig. 4 is a vertical section on the line 4 4 of Fig. 1. Fig. 5 is another, but enlarged, vertical section on the line 5 5 of Fig. 1. Fig. 6 is a perspective view of one of the guards employed for preventing kegs passing into the tank inopportunely.

The oblong soaking-tank A is adapted to hold a suitable quantity of water and will in practice be provided with a suitable discharge cock or valve. (Not shown.)

Within the tank A, and lengthwise thereof, I arrange a double track B—that is to say, two rails or bars, which are duly spaced apart and rigidly connected. This track B is pivoted at its front end on a cross shaft or rod 2, so as to oscillate vertically. Said cross shaft or rod 2 is located in the rear half of the tank A and about equidistant from top and bottom of the same.

It is apparent that as the track B oscillates— *i. e.*, swings vertically from the position shown by dotted lines, Fig. 1, to that shown by full lines, Fig. 2—the kegs *x*, supported thereon, will be also raised and lowered in the water, and thereby simultaneously soaked and rinsed.

The keg elevating and delivering device C is located and operates in the space between the rear end of the tank and the rear end of the oscillating track B. Said device C is formed in part of a central plate 3, that inclines downwardly rearwardly, a vertical rear plate 3', and side wings or guards 4. It is provided with pendent arms 5, that serve as guards, preventing the kegs *x* from passing into the space beneath the device C when the latter is elevated, as shown in Fig. 1. The rear side of the device C works in frictional contact with the vertical end wall of the tank and is guided vertically in ways *a*, formed by engaging flanges attached, respectively, to the tank and device C. The latter is raised and lowered alternately in a vertical line by means of a rotary crank-shaft 6 and links 7, that connect its opposite cranks 8 with arms or bars 9, Figs. 2 and 4, which bars are rigidly attached to the ends of the device C. Said crank-shaft 6 is driven by a power-shaft 10, having a pulley 11, on which runs a belt 12.

The two shafts 6 and 10 are operatively connected by a pinion 13 and large cog-gear 14. Both shafts are journaled in the upper ends of curved vertical standards 15, forming rigid attachments of the tank A. It is to be understood, however, that any other suitable means for raising and lowering the elevating and delivery device C may be adopted.

Bars 16 slide in keepers 17 and between guides 18, formed of parallel strips secured to the sides of the tank near its rear end. The said bars 16 are connected at their upper ends with the same pivots 19, Fig. 4, as the bars 9 and connecting-rods 7, before described. The said guide-bars 16 also serve as a primary means for imparting oscillation to the keg-track B, acting for that purpose through the medium of levers 20, Figs. 1 and 3, pivoted centrally on the outside of the tank A, and two sets of connecting bars or links 21 and 22—that is to say, one end of each side lever 20 is loosely connected, Fig. 1, with a guide-bar 16 by means of pins or studs 23, between which it works slidably. The outer connecting-bars 21 are pivoted to the levers 20 at points on the front side of the pivots of said levers. The inner bars 22, that extend down into the tank A, are pivoted to the oscillating track B and to the outer bars 21 at their upper ends, and a shaft or rod 24, Fig. 3, extends between such pivotal points. Thus rotation of the driving-shaft 10 produces slower rotation of crank-shaft 6, and thereby reciprocates the elevating and delivery device C and oscillates the keg-track B, the free end of the latter descending as the said device rises, and vice versa, as indicated in Figs. 1 and 2. When the said parts A B C are in the position shown in Fig. 2, the track B is inclined downward toward the front, and the device C being also lowered at that time a keg $x$ rolls from one into the other. Then as the device C rises the pendent guards 5 hold back the other kegs $x$ that still remain on the track B. It will be apparent that the keg which thus passes onto the device C is held from returning not only by pressure of the kegs behind it, but also by the inclination of the floor or bed of said device C. So soon as the latter attains due height—i. e., with its outer edge in line with the top of the tank A—the keg carried by it will roll off, as shown in Fig. 1, onto a track or guide-board or chute $a'$, which will in turn deliver it to a scrubbing-machine or into any other receiver.

Since the tank A can accommodate but a definite number of kegs or casks $x$, it is necessary to provide means for preventing others from crowding upon those that are held therein, and for this purpose I employ the two guards 26 and 27. The former, 26, are formed of right-angular arms or bars that are arranged above the tank A and pivoted on a cross-shaft 28. The upwardly-bent ends 26' of said bars oscillate vertically over and adjacent to the front end of the tank, and such movement is imparted by reason of the connection and support of the guard-bars on the cross-bar 24, that connects links 21 and 22. Thus when the free end of the track B is raised or lowered, as shown in Figs. 1 and 2, the guards 26 are similarly operated and serve to prevent or allow entrance of another keg correspondingly. It will be understood that a keg is admitted to the tank immediately following the discharge of one therefrom. The secondary guards 27 are formed of arms which are rigidly attached to forward extensions of the side levers 20 and work through the slots 29 in the chute or inclined guideway 30, down which the kegs $x$ roll into the tank A. These guards 27 rise and fall with the former, 26, and supplement their function by providing an additional safeguard against crowding or overfilling the tank.

I thus provide an automatic apparatus by which the kegs or other casks may be well soaked and rinsed without requiring attention or care in handling of the kegs while passing through it.

What I claim is—

1. In an apparatus of the character specified, the combination with the tank proper of an oscillating track, a vertically-slidable device, arranged adjacent to one end of said track, and means connected with both such track and device, for operating them automatically and simultaneously, substantially as shown and described, whereby as the device descends it may receive a keg from the track and then elevate it as specified.

2. The combination with the tank and a fixed track, of a vertically-oscillating track-section having one end arranged adjacent said fixed track and forming a continuation of the same at one point in its oscillation, and a vertically-slidable plate located adjacent the opposite end of said oscillating track-section and means which operatively connect it with such section, whereby it is raised when the end of the section adjacent the fixed track is lowered, and vice versa, as set forth.

3. In the apparatus specified, the combination with the tank, of a vertically-oscillating track or keg-support, and a vertically-slidable device, connected with said track whereby to coöperate with the same and elevate and deliver kegs therefrom, substantially as shown and described.

4. In the apparatus specified, the combination with the tank proper of a vertically-oscillating track or keg-support pivoted in the latter, and a vertically-reciprocating device, for elevating and delivering kegs, the same being arranged at one end of the tank adjacent to the end of the aforesaid track, substantially as shown and described.

5. In a device of the character described, the combination with the vertically-oscillating track, of a vertically-reciprocating plate arranged adjacent one end of said track, a connection between the track and plate whereby the latter will rise when the opposite end of the former is depressed, and vice versa, and means connected to the said plate whereby to obstruct the adjacent end of the track when the plate is raised, as set forth.

6. In the apparatus specified, the combination with the tank of a keg-support composed of a suitable frame which is pivoted within said tank and adapted to oscillate vertically as specified, and a vertically-slidable device for elevating and delivering kegs, the same being arranged adjacent to the pivotal end of said frame, and means for operating it as specified, whereby the said device is lowered simultaneously with the elevation of the opposite end of said frame, and whereby the kegs are caused to roll from the frame upon said device, substantially as shown and described.

7. In the apparatus specified, the combination with the tank and a track or keg-support arranged therein, of a vertically-slidable device for elevating and delivering kegs, the same having pendent arms or guards on the side adjacent to the track, substantially as shown and described.

8. In the apparatus specified, the combination with the tank of the vertically-slidable device, for elevating and delivering kegs, the same having an inclined floor or bottom, substantially as shown and described.

9. In the apparatus specified, the combination with the tank of the vertically-movable device for elevating and delivering kegs, the same having an inclined floor or bottom, vertical side wings, and pendent guards, and means for operating said device, substantially as shown and described.

10. In the apparatus specified, the combination with the tank and a track or keg-support adapted to oscillate therein, of the vertically-movable keg elevating and delivering device, vertical guides therefor, a horizontal crank-shaft, and links connecting the latter with said device, substantially as shown and described.

11. In the apparatus specified, the combination with the tank and the oscillating keg-track pivoted therein of means for operating the same which consist of one or more levers pivoted to the sides of the tank, links connecting said levers with the free end of the track, and other links or bars connecting with the opposite ends of said levers, and a device for vertically oscillating said links or bars, substantially as shown and described.

12. In the apparatus specified, the combination with the tank of a rotary crank-shaft, bars working in vertical guides on the sides of the tank proper, means connecting said bars with the crank-shaft, levers pivoted on the sides of the tank and loosely connected at one end with the aforesaid guide-bars, an oscillating keg-track arranged and pivoted within the tank, and links connecting the free end of said track with the aforesaid side levers, substantially as shown and described.

13. In the apparatus specified, the combination with the tank and the keg-track arranged therein of a vertically-movable guard, arranged adjacent to the front end of the tank, and adapted to prevent the entrance of kegs into the latter, inopportunely, and means for moving the said guards, substantially as shown and described.

14. In the apparatus specified, the combination with the tank of the oscillating keg-track pivoted therein and an oscillating guard connected with the front end of the track and adapted to oscillate simultaneously therewith, and means for imparting the required motion to both track and guard, substantially as shown and described.

15. In the apparatus specified, the combination with the tank of the guard composed of right-angular bars, which are pivoted above the said tank and have their free ends arranged in a vertical plane, or practically so, and adjacent to the front end of the tank, the oscillating track or keg-support pivoted near the opposite end of said tank, links connecting the free ends of the guards and track, side levers pivoted as specified and connected with the guards and track for oscillating the same, and means for imparting oscillation to said levers, substantially as shown and described.

16. In the apparatus specified, the combination with the tank and guards arranged above and adjacent to the front end of the latter, and supplemental guards adapted to project through the kegway or chute, and means for imparting vertical oscillation to both guards, substantially as shown and described.

17. In the apparatus specified, the combination with the tank of guards for preventing untimely entrance of kegs into the latter, means for connecting the two guards and for imparting simultaneous oscillation thereto, the guards being so arranged relatively that as one recedes from the keg-guideway the other enters and obstructs the same, substantially as shown and described.

18. In the apparatus specified, the combination with the tank of levers pivoted to the sides thereof, means for oscillating the same, and guards composed of bars or rods fixed to the end of said levers and standing normally vertical, whereby they are adapted to oscillate with the levers and project into the guideway for the kegs, substantially as shown and described.

CHARLES ZIES.

Witnesses:
ROBERT C. RHODES,
THOMAS R. MORSE.